(12) United States Patent
 Sokhey et al.

(10) Patent No.: US 8,776,527 B1
(45) Date of Patent: Jul. 15, 2014

(54) TECHNIQUES TO REDUCE INFRARED DETECTION OF A GAS TURBINE ENGINE

(75) Inventors: Jagdish Sokhey, Indianapolis, IN (US); Brian Kornegay, Indianapolis, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 1104 days.

(21) Appl. No.: 12/214,269

(22) Filed: Jun. 17, 2008
 (Under 37 CFR 1.47)

(51) Int. Cl.
 *F02K 1/82* (2006.01)
 *F02K 1/52* (2006.01)
 *F02K 1/04* (2006.01)

(52) U.S. Cl.
 USPC .......................................................... 60/770

(58) Field of Classification Search
 USPC .......... 60/264, 770, 39.5, 761–766; 181/213, 181/220; 239/265.17, 265.19, 127.3
 See application file for complete search history.

(56) References Cited

U.S. PATENT DOCUMENTS

| | | | |
|---|---|---|---|
| 3,048,376 A * | 8/1962 | Howald et al. | 366/262 |
| 3,670,501 A * | 6/1972 | Arand | 60/763 |
| 3,673,803 A | 7/1972 | Macdonald | |
| 3,701,255 A * | 10/1972 | Markowski | 60/762 |
| 3,938,742 A * | 2/1976 | Corson, Jr. | 239/265.11 |
| 4,077,206 A | 3/1978 | Ayyagari | |
| 4,175,640 A | 11/1979 | Birch et al. | |
| 4,214,441 A * | 7/1980 | Mouritsen et al. | 60/262 |
| 4,240,519 A | 12/1980 | Wynosky | |
| 4,295,332 A | 10/1981 | Steyer et al. | |
| 4,372,110 A * | 2/1983 | Cheng et al. | 60/262 |
| 4,543,784 A | 10/1985 | Kirker | |
| 4,576,002 A | 3/1986 | Mavrocostas | |
| 4,577,462 A | 3/1986 | Robertson | |
| 5,269,132 A | 12/1993 | Loucks | |
| 5,344,102 A * | 9/1994 | Nakadate et al. | 244/35 R |
| 5,722,233 A | 3/1998 | Nikkanen et al. | |
| 5,769,317 A | 6/1998 | Sokhey et al. | |
| 6,105,901 A | 8/2000 | Ulanoski | |
| 6,606,854 B1 | 8/2003 | Siefker et al. | |
| 7,178,338 B2 | 2/2007 | Whurr | |
| 2002/0178711 A1 | 12/2002 | Martens | |
| 2004/0068981 A1* | 4/2004 | Siefker et al. | 60/262 |
| 2004/0074224 A1 | 4/2004 | Hebert | |
| 2004/0083713 A1 | 5/2004 | Clark | |
| 2005/0081509 A1* | 4/2005 | Johnson | 60/226.1 |
| 2010/0146980 A1* | 6/2010 | Strom et al. | 60/770 |

* cited by examiner

*Primary Examiner* — Andrew Nguyen
(74) *Attorney, Agent, or Firm* — Krieg DeVault LLP (57) ABSTRACT

A discharge nozzle is provided having a centerbody and a conduit enclosing the centerbody and is operable to receive exhaust flow from a turbine discharge of a gas turbine engine. In one form the centerbody is symmetric and extends along the flow direction, rising away from a reference axis to a maximum position before falling and converging on the reference axis. A set of rings is disposed between the centerbody and the conduit and are positioned between the centerbody and the conduit.

28 Claims, 6 Drawing Sheets

TECHNIQUES TO REDUCE INFRARED DETECTION OF A GAS TURBINE ENGINE

BACKGROUND

The present invention generally relates to gas turbine engine exhausts, and more particularly, but not exclusively, to devices used in gas turbine engine exhausts. Gas turbine engines operate in a variety of conditions and produce exhaust flow at a variety of mass flow rates, temperatures, and pressures. The exhaust flow and components of the gas turbine engine may produce a distinct thermal signature when the gas turbine engine is operating. Blocking the view of an external observer into a hot section of a gas turbine engine remains an area of interest. Unfortunately, some existing systems often fall short of desired performance relative to certain applications. Accordingly, there remains a need for further contributions in this area of technology.

SUMMARY

One embodiment of the present invention includes a unique infrared signature suppression technique for gas turbine engines. Other embodiments include unique methods, systems, devices, and apparatus involving the reduction of detectable infrared radiation from a gas turbine engine. Further embodiments, forms, features, aspects, benefits, and advantages of the present application shall become apparent from the description and figures provided herewith.

DETAILED DESCRIPTION OF REPRESENTATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 1:
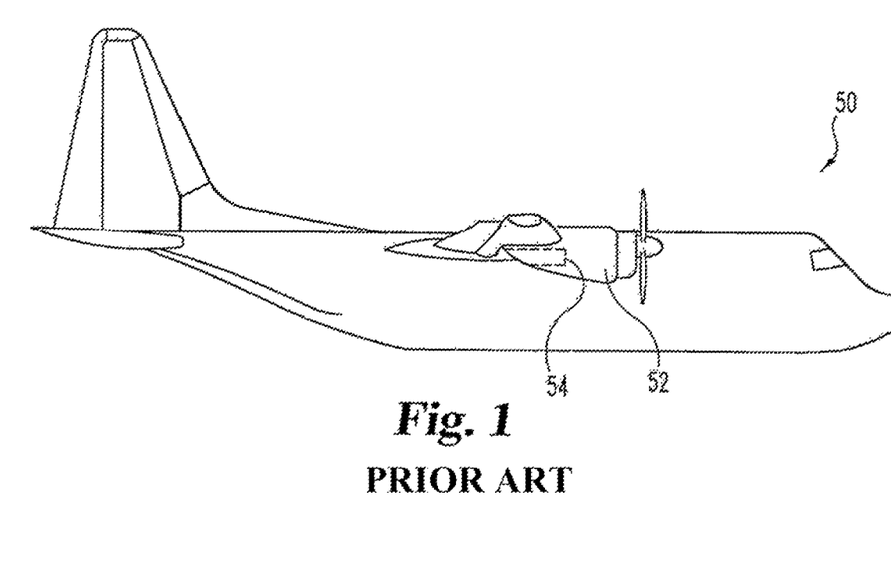
FIG. 1 is a diagrammatic view of a vehicle with a gas turbine engine serving as prime mover.

Turning now to FIG. 1, shown is an aircraft 50 having a gas turbine engine 52 used as a source of propulsion. The gas turbine engine 52 produces an exhaust stream at elevated temperatures caused at least by a combustion process. At least part of the exhaust stream may be received by a discharge nozzle 54 which acts to reduce and/or block the emission of infrared radiation from the gas turbine engine 52. By reducing and/or blocking emission of infrared radiation, the discharge nozzle 54 assists in thwarting infrared detection devices used in certain anti-aircraft weapons. As used herein, the term "aircraft" includes, but is not limited to, helicopters, airplanes, unmanned space vehicles, satellites, fixed wing vehicles, variable wing vehicles, rotary wing vehicles, hover crafts, and other airborne and/or extraterrestrial (spacecraft) vehicles. Further, the present inventions are contemplated for utilization in other applications that may not be coupled with an aircraft such as, for example, industrial applications, power generation, pumping sets, naval propulsion, weapon systems, security systems, perimeter defense/security systems, and the like known to one of ordinary skill in the art.

The discharge nozzle 54 may be used with many different engine types. For example, though the gas turbine engine 52 is depicted in FIG. 1 as a turboprop engine, other types of gas turbine engines may also be used such as turbojets, turbofans, turboshafts, ramjets, and scramjets, to set forth just a few non-limiting examples. In addition, the discharge nozzle 54 may be used in other types of internal combustion engines such as the reciprocating engine variety. Hybrid engines are also contemplated herein.

Figure 2:
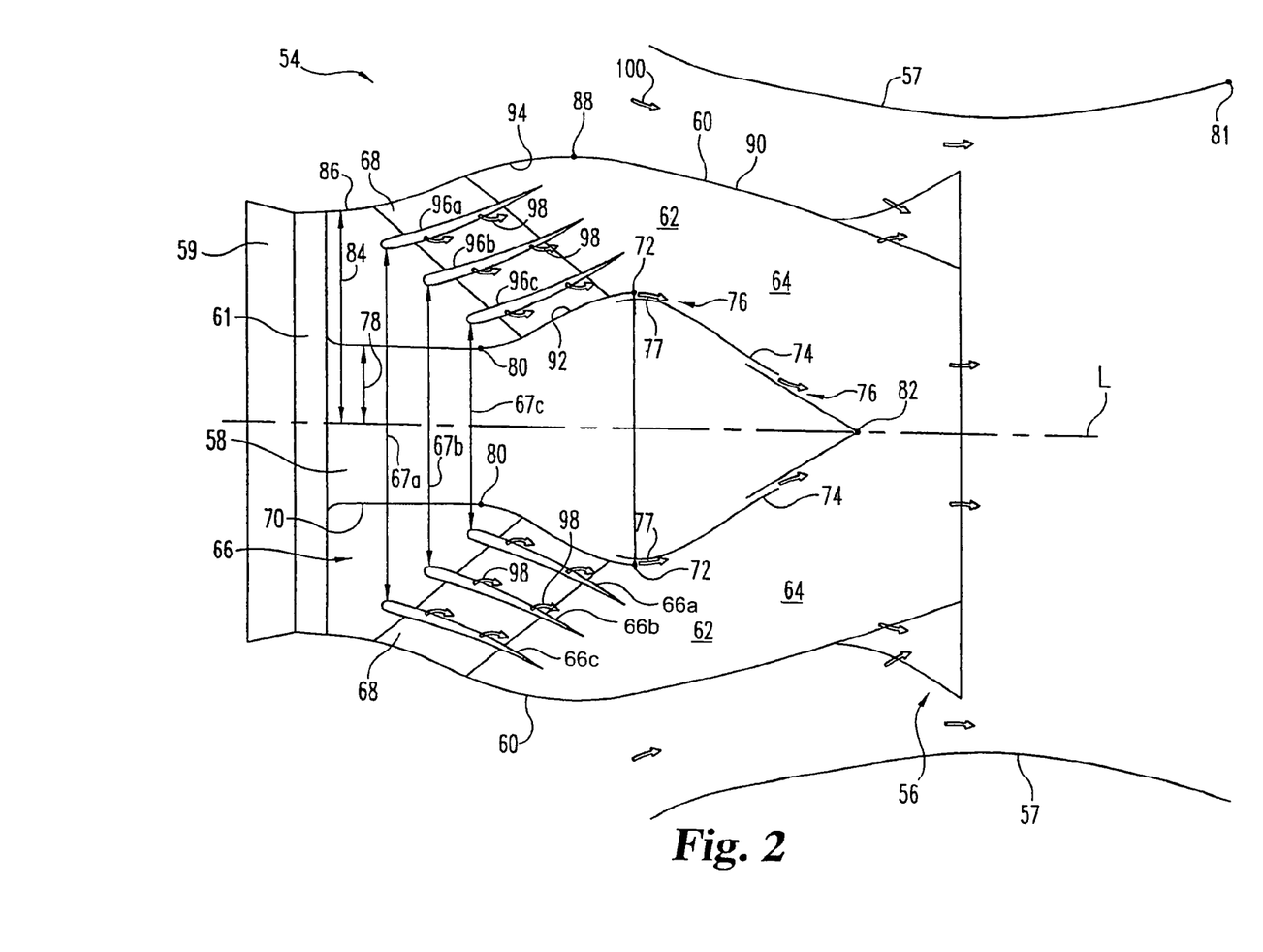
FIG. 2 is a partial schematic, side sectional view of one type of discharge subsystem to reduce detection of infrared radiation through an outlet of the gas turbine engine.

Referring to FIG. 2, one embodiment of the discharge nozzle 54 is shown within an aircraft nacelle 57. The aircraft nacelle 57 is used to enclose the gas turbine engine 52 and at least part of the discharge nozzle 54 and assists in reducing aircraft drag. The nacelle 57 in the illustrative embodiment may be replaced with any suitable aircraft structure, if necessary, to enclose the discharge nozzle 54. The discharge nozzle 54 is oriented downstream of a turbine 59 and a turbine discharge 61.

The discharge nozzle 54 includes a centerbody 58, a conduit 60, a passage 62 between the centerbody 58 and the conduit 60, a diffuser 64, rings 66, struts 68 and the mixer 56. The centerbody 58 includes an upstream side 70, an apex 72, and a downstream side 74 and in one form is a body of revolution about an axis, such as the reference axis L in the illustrative embodiment. The centerbody 58 also includes cooling slots 76 which may emit a fluid 77 such as ambient air, or air from a compressor of the gas turbine engine 52, to set forth just two non-limiting examples. In the illustrative embodiments, the centerbody 58 is symmetric about the reference axis L, while in other embodiments the centerbody 58 may be non-symmetrical. In addition, though the centerbody 58 is centered about the reference axis L, in some embodiments the centerbody 58 may not be centered about the axis L. The centerbody 58 extends from the turbine discharge 61 to a termination point 82. In some embodiments the centerbody 58 may extend from a point or structure other than the turbine discharge 61. The termination point 82 may be upstream, coincident with, or downstream of either the conduit 60 or the mixer 56.

The upstream side 70 extends along the reference axis L approximately from the turbine discharge 61 to the apex 72. In some embodiments, the upstream side 70 may extend from a point or structure other than a turbine discharge. The upstream side 70 is spaced a distance 78 from the axis L which remains substantially constant until the upstream side 70 reaches a point 80, where it then enters an area characterized by an increase in the distance 78. In some embodiments, the upstream side 70 may have a portion or portions that are not at a substantially constant distance 78 from the reference axis L between the turbine discharge 61 and the point 80. For example, some embodiments of the upstream side 70 may have an increasing distance 78 just upstream of the point 80.

As the upstream side 70 continues to extend along the reference axis L from the point 80 it also continues to increase in distance 78 until it reaches the apex 72, or an area near the apex 72. The shape of the upstream side 70 between the point 80 and the apex 72 may be any suitable shape, including a straight line. The shape may also have smoothed transitions around the point 80 and the apex 72 if necessary for fluid flow or other considerations.

The apex 72 is the point on the centerbody 58 furthest from the reference axis L. In some embodiments, the centerbody 58 may not have a well-defined apex 72, in which case an arbitrary point can be selected as the apex. For example, the centerbody 58 may have a flat top surface that is parallel to the reference axis L. In this case, the apex 72 may be chosen as an upstream edge of the flat surface, a downstream edge of the flat surface, or any point in between.

The downstream side 74 begins at or near the apex 72 and continues to the termination point 82. The downstream side 74 may extend in a straight line or may take on any other shape in other embodiments.

The cooling slots 76 are formed around the circumferential periphery of the centerbody 58 in the illustrative embodiment, but in other embodiments may be formed only partially around the periphery. Some embodiments may include fewer cooling slots 76 than the illustrative embodiment, while other embodiments may include more cooling slots 76. Though the illustrative embodiment depicts a cooling slot 76 formed at the apex 72 and at a location downstream from the apex 72, the cooling slots 76 may be formed in any location of the centerbody 58 in other embodiments.

The conduit 60 encloses the centerbody 58 and extends along the reference axis L. The conduit 60 includes an upstream side 86, an apex 88, and a downstream side 90. Much like the centerbody 58 in the illustrative embodiment, the conduit 60 is centered about the reference axis L, but in some embodiments may not be centered. In addition, the conduit 60 is depicted as symmetrical but in some embodiments may be non-symmetrical. The conduit 60 extends from the turbine discharge 61 to the mixer 56. In some embodiments, the conduit 60 may extend from structures or points other than the turbine discharge 61. In still further embodiments, the mixer 56 may not be present such that the conduit 60 includes a termination point. In any event, the conduit 60 may extend to a point that is at the same axial location of the termination point 82 of the centerbody 58, or may be upstream or downstream of the termination point 82.

The upstream side 86 of the conduit 60 extends along the reference axis L from the turbine discharge 61 to the apex 88. In some embodiments, the upstream side 86 may extend from a point or structure other than a turbine discharge. The upstream side 86 is spaced a distance 84 from the axis L which in the illustrative embodiment increases from the turbine discharge 61 to the apex 88. In some embodiments, however, the conduit 60 may have a portion or portions that extend at a constant distance 84 or a decreasing distance 84. As the upstream side 86 extends along the reference axis L it rises away from the reference axis L until it reaches the apex 88, or an area near the apex 88. The shape of the upstream side 86 between the turbine discharge 61 and the apex 88 may be any suitable shape, including a straight line.

The apex 88 is the point on the conduit 60 furthest from the reference axis L. In some embodiments, the conduit 60 may not have a well-defined apex 88, in which case an arbitrary point can be selected as the apex. For example, the conduit 60 may have a flat top surface that is parallel to the reference axis L. In this case, the apex 88 may be chosen as an upstream edge of the flat surface, a downstream edge of the flat surface, or any point in between. The apex 88 of the illustrative embodiment is upstream of the apex 72, but in some embodiments may be at the same or downstream position as the apex 72.

The downstream side 90 begins at or near the apex 88 and continues to the mixer 56, if present. The downstream side 90 may extend in a straight line or may take on any other shape in other embodiments.

The passage 62 is formed between the conduit 60 and the centerbody 58 and is annular in shape. Some embodiments, however, may only be partially annular in shape. The passage 62 includes a hub side 92 and a tip side 94 and has a cross sectional area that can be constant along portions of its length. In some portions of the passage 62, the cross sectional area may increase. For example, as the passage 62 extends from the turbine discharge 61 it may have an increase in cross sectional as it approaches one or more of the rings 66. In addition, in some embodiments the cross sectional area may also increase in cross sectional area in a portion upstream of the mixer 56.

The diffuser 64 includes an area within the passage 62 downstream of the apex 72 of the centerbody 58 characterized by an increase in cross sectional area. In some embodiments the diffuser 64 may be included upstream of the apex 72, while in other embodiments the diffuser 64 may not be present at all.

The rings 66 are disposed upstream of the apex 72 in the illustrative embodiment and are annular in shape and act in conjunction with the centerbody 58 to block the view of the turbine 59 from an outside observer. Though three rings 66a, 66b, and 66c are depicted in the illustrative embodiment, other embodiments may include fewer rings or more rings. Each of the rings 66 includes an airfoil cross sectional shape 96a, 96b, and 96c. In addition, the rings 66 are symmetric and each are centered about the axis L, though some embodiments may be non-symmetric and others may additionally and/or alternatively not be centered about the axis L. Each ring 66a, 66b, and 66c has an annular diameter 67a, 67b, and 67c, respectively, as measured between the upstream edge of each of the individual ring 66a, 66b, and 66c. In one form the diameters 67a, 67b, and 67c are perpendicular to the axis L, but need not be in all embodiments. The rings 66a, 66b, and 66c may be spaced apart from one another to maintain a substantially constant inter-ring distance along the axis L to assist in minimizing and/or eliminating a cross sectional area constriction between the rings. Some embodiments may have a variable cross sectional area between the rings along the axis L. In still further embodiments, the cross sectional area may increase or decrease. The rings 66 may be stacked one inside the other because the rings may have unique diameters. Usually one of the rings 66 has a largest diameter which allows other of the rings 66 to be stacked or placed inside the largest diameter ring, whether the other rings are located upstream or downstream of the greatest diameter ring.

The leading edges and trailing edges of the rings 66 are axially displaced relative to each other. For example, the leading edge of the ring 66a is upstream of the leading edge of the ring 66b, which is upstream of the leading edge of the ring 66c. The same is true for the trailing edges. In some embodiments, the leading and trailing edges of the rings 66a, 66b, and 66c may be axially displaced according to another relationship. For example, the leading edge of the ring 66a may be downstream of the leading edge of the ring 66b, which may be upstream of the leading edge of the ring 66c.

The leading edges of each of the rings 66 are upstream of a leading edge of the struts 68. In addition, the trailing edges of each of the rings 66 are downstream of a trailing edge of the struts 68. In some embodiments, the leading edges of each of the rings 66 are at or downstream of the leading edge of the struts 68. In other embodiments, only some leading edges of the rings 66 may be at or downstream of the struts 68. In further embodiments, the leading edges of the rings relative to a strut 68 located at one circumferential location around the annulars of the strut 68 may be differently configured than the leading edges of the rings relative to a strut located at another circumferential location. For example, the leading edges of the rings 66 may be upstream of the leading edge of a strut at a circumferential location at the top of the annulars, while the leading edges of the rings 66 may have a different relationship for a strut located at a circumferential location located at the bottom of the annulars. The trailing edges of the rings 66 may be placed in various configurations relative to the trailing edges of the struts 68 in a similar manner that the leading edges of the rings 66 may be placed in various and alternative configurations to the leading edges of the struts 68 as set forth hereinabove.

In some embodiments, the rings may be operable to emit a cooling fluid such as ambient air, or compressor air. Arrows 98 in the illustrative embodiment depict cooling air being discharged from the rings 66a, 66b, and 66c. Though the illustrative embodiment depicts discharges of cooling fluid from two locations in each of the rings 66a, 66b, and 66c, some embodiments may include fewer or more than two discharges. Not all the rings 66, furthermore, need have the same number of discharges.

In some embodiments, the rings 66 may be only partially annular or may not be annular at all. Furthermore, in some embodiments the rings 66 may be segmented such that more than one segment together forms an annular or partially annular shape. In those embodiments having partially annular shapes, the distance of the rings 66 from the reference axis L may be measured from a similar, arbitrary point such as an upstream point on a side edge of the ring. In these cases, the rings 66 can still be viewed as being stacked within the passage 62.

In still further embodiments, one or more of the rings 66 may be non-symmetric, some of the rings may have similar diameters or distances from the reference axis L, and one or more of the rings may not be centered about the axis L. In other embodiments the rings 66 may be positioned downstream of the apex 72 or may be distributed, either evenly or unevenly, on either side of the apex 72. Some embodiments may even include the rings 66 distributed at the apex 72.

The airfoil shapes 96a, 96b, and 96c have identical properties in the illustrative embodiment, but other embodiments may include airfoil shapes 96a, 96b, and 96c that are different. Characteristics of the airfoil shapes that may differ include, but are not limited to, camber, mean camber line, airfoil thickness, chord length, and reflex shape, if any. Other characteristics may also be different. In some embodiments, the airfoil shapes may vary around the circumference of the rings. For example, the airfoil shape at the top of the ring may have a different camber than the airfoil shape at the bottom of the same ring. In some embodiments, any of the airfoil shapes 96a, 96b, and 96c may not have a varying camber, such as might be the case with a constant thickness, flat plate airfoil, to set forth just one non-limiting example. Other embodiments may have a constant thickness but the shape may be curved such that the section has a curved mean camber line.

The struts 68 provide support and/or otherwise maintain the spacing of the rings 66 within the passage 62. Two struts are depicted in the illustrative embodiment and both extend from the centerbody 58 on the hub side 92 of the passage 62 to the conduit 60 on the tip side 94. In some embodiments, the struts 68 may extend from either the centerbody 58 or the conduit 60 but not reach the other side of the passage 62. For example, in one embodiment the strut may extend from the conduit 60 but not be attached to the centerbody 58. The struts 68 may extend in a unitary whole from the centerbody 58 to the conduit 60, or in some embodiments may be broken into segments. For example, in some embodiments the struts 68 may be segmented between the conduit 60 and the ring 66a, between the rings 66a and 66b, the rings 66b and 66c, and the ring 66c and the centerbody 58. In such embodiments the struts 68 may be clocked to different circumferential locations depending on whether the struts are located between, say, the rings 66a and 66b, or between the rings 66b and 66c, to set forth just one non-limiting embodiment. Though the illustrative embodiment includes two struts 68, other embodiments may have fewer or more struts, in which case not all struts need be the same. The strut 68 may extend at any angle relative to the reference axis L. Furthermore, the strut 68 may situated upstream, downstream, or both of the apex 72 of the centerbody 58. In still other embodiments, the struts 68 may extend further than the termination point 82 of the centerbody 58. The leading edge and the trailing edge of the struts 68 can have any shape, including straight or curvilinear shapes. The leading edges and trailing edges of the struts 68 can either be upstream or downstream of the respective leading edges and trailing edges of the rings 66. In some embodiments, one or more of the struts 68 may be cooled or may have cooling passages.

The mixer 56 is disposed downstream of the rings 66 and is operable to mix an exhaust flow from the gas turbine engine 52 with cooling air 100, which may be any suitable cooling fluid such as, but not limited to, ambient air. The mixer 56 can be a lobed mixer, a chevron nozzle, or fluidic nozzle, to set forth just a few non-limiting examples. Furthermore, the mixer 56 may or may not be included in some embodiments.

The nacelle 57 is used to enclose the gas turbine engine 52 and in some embodiments provides a structure to supply cooling fluid to the discharge nozzle 54. The nacelle 57 includes a trailing point 81 that is downstream of the mixer 56. In some embodiments the nacelle 57 may be upstream of the mixer 56 or upstream of any other location of the discharge nozzle 54. In some embodiments the nacelle 57 may not be needed.

Figure 3:
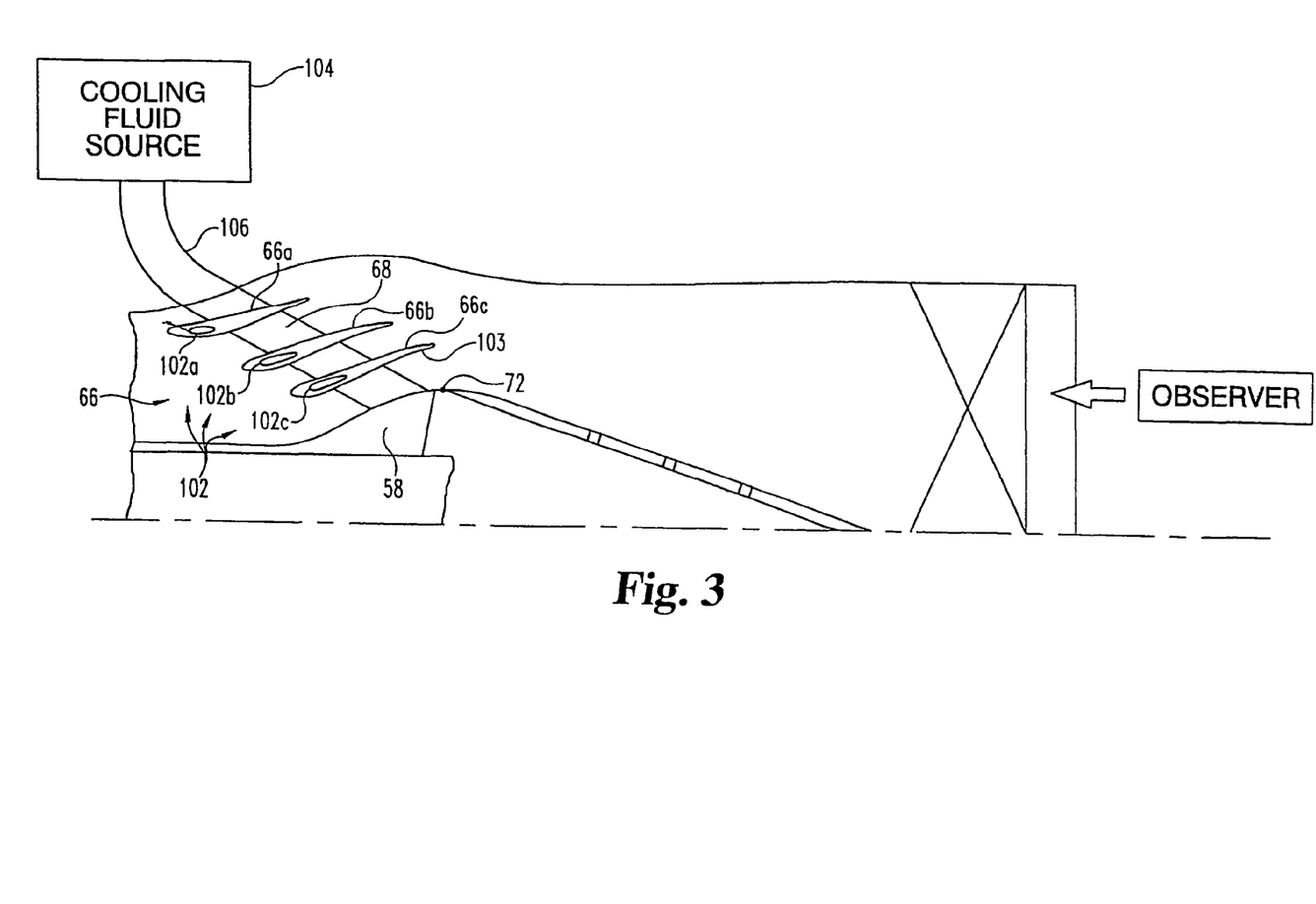
FIG. 3 is a partial schematic, side sectional view of another type of discharge subsystem to reduce detection of infrared radiation through an outlet of the gas turbine engine.

Turning now to FIG. 3, a partial cross-sectional view of another embodiment of the discharge nozzle 54 is shown. The rings 66 are disposed at or upstream of the apex 72 of the centerbody 58 along the strut 68. Each of the rings 66a, 66b, and 66c in the embodiment depicted in FIG. 3 has a unique airfoil shape. Of note in FIG. 3 is the reflex shape of the ring 66c near the trailing edge and depicted as reference numeral 103. In some embodiments, more than one of the rings 66 may have a reflex shape. Each of the rings 66 includes a plenum 102 in fluid communication with a cooling source 104 which provide cooling fluid that may be circulated within the rings 66 or may be discharged as in the embodiments above. Plenums 102a, 102b, and 102c may differ in size and configuration between the rings 66a, 66b, and 66c. In the illustrative embodiment, each of the plenums 102 extends circumferentially around the rings 66.

The cooling source 104 is coupled to the rings 66 through a conduit 106 and the strut 68. The cooling source 104 may be any suitable source such as ambient air or pressurized air, which may or may not originate from within a compressor of the gas turbine engine 52. In operation, a cooling fluid flows from the cooling fluid source 104, through the strut 68 to the plenums 102 of the rings 66. Cooling fluid also flows through the strut 68 to the centerbody 58 where it may also be circulated or discharged. The cooling fluid may be at any temperature, pressure, and flow rate suitable to meet one or more cooling demands of the rings 66 and the centerbody 58.

Figure 4:
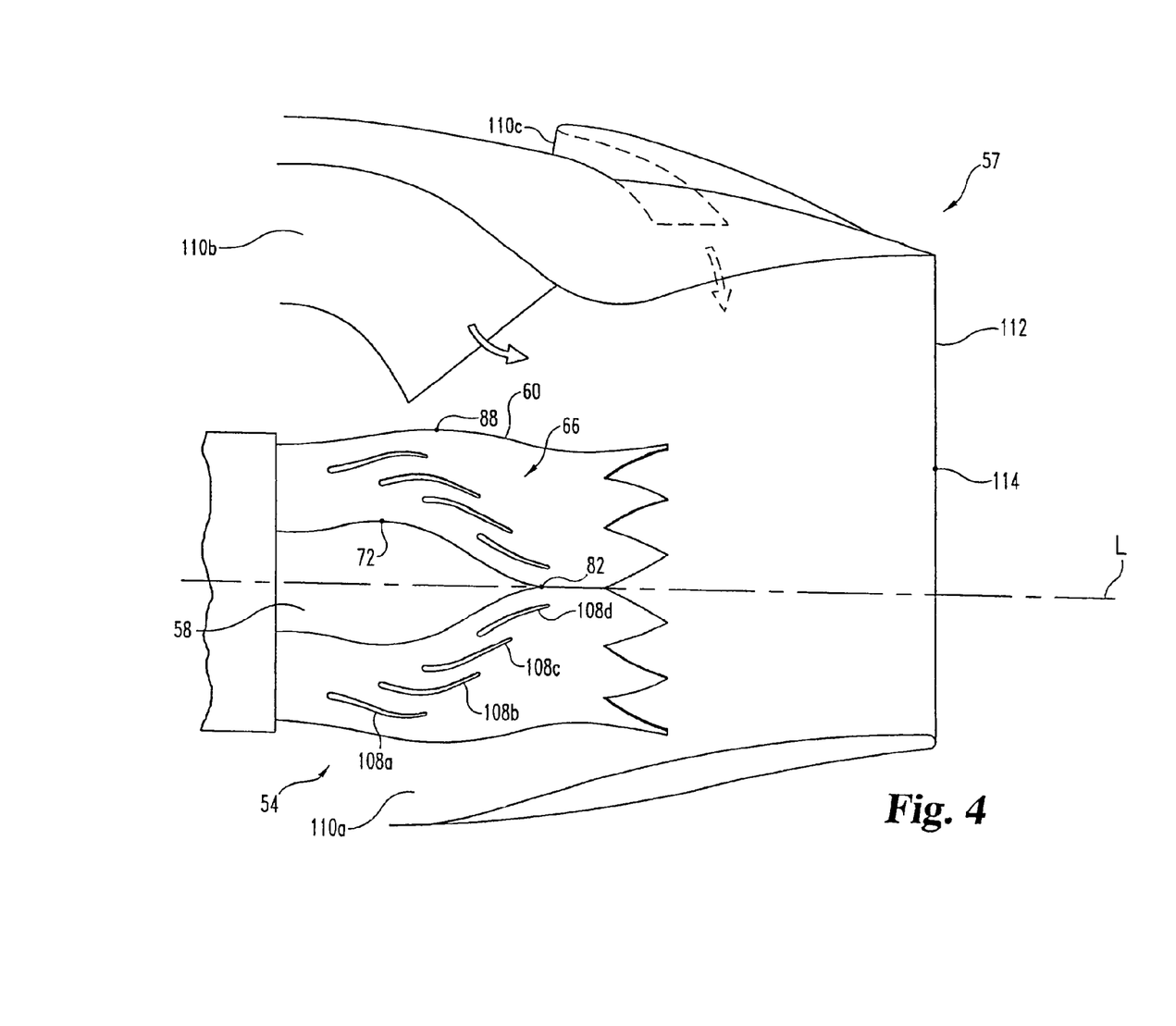
FIG. 4 is a partial schematic, side sectional view of still another type of discharge subsystem to reduce detection of infrared radiation through an outlet of the gas turbine engine.

Turning now to FIG. 4, a partial cross sectional view is shown of one embodiment of the discharge nozzle 54 and the nacelle 57. Four rings 66 are depicted in this embodiment and are arranged both upstream and downstream of the apex 72 of the centerbody 58. Airfoil cross-sectional shapes 108a, 108b, 108c, and 108d are different in that each has at least a unique camber, chord length and relative orientation to reference axis L. The trailing edge of the airfoil 108d is also arranged downstream of the termination point 82. Also of note in this embodiment, the apex 88 of the conduit 60 is disposed downstream of the apex 72 of the centerbody 58.

The nacelle 57 is non-symmetric and includes three scoops 110a, 110b, and 110c. The nacelle 57 includes an outlet 112 having a center 114 located above the reference axis L. In some embodiments the outlet 112 of the nacelle 57 may have the center 114 located on the reference axis L, or below the reference axis L. The scoops 110a, 110b, 110c direct cooling air to be mixed with an exhaust stream that has at least partially passed through the discharge nozzle 54. Though only three scoops are depicted in the embodiment in FIG. 4, some embodiments of the nacelle 57 may have fewer or more scoops. The scoops may be operable to deliver cooling fluid in the general direction of the exhaust flow through the discharge nozzle 54, as may be seen by the scoop 110a, or may deliver cooling fluid at an angle to the exhaust flow though the discharge nozzle, as may be seen by the scoops 110b and 110c.

Figure 5:
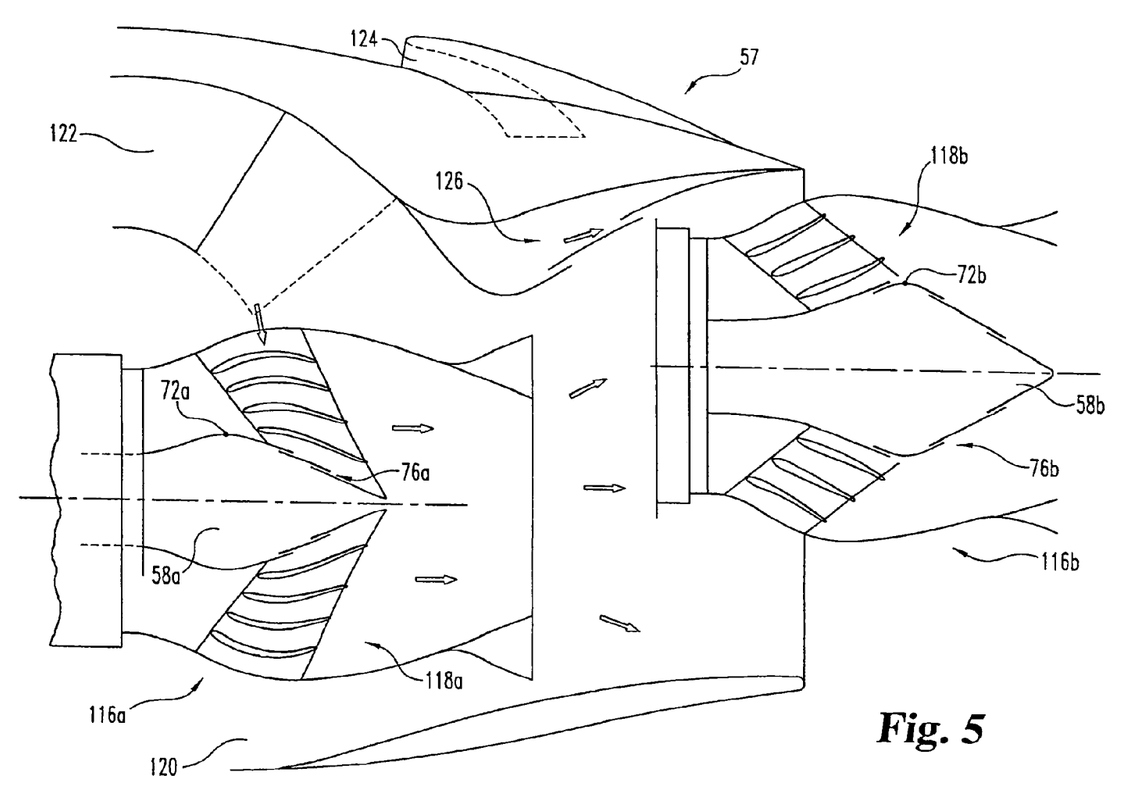
FIG. 5 is a partial schematic, side sectional view of yet another type of discharge subsystem to reduce detection of infrared radiation through an outlet of the gas turbine engine.

Turning now to FIG. 5, a partial cross-sectional view is shown depicting alternative locations of two embodiments of discharge nozzles 116a and 116b, both of which are at least partially disposed within the nacelle 57. The discharge nozzle 116a is attached to the turbine discharge 61 of the gas turbine engine 52. The discharge nozzle 116a includes four rings 118a arranged downstream of an apex 72a. Two cooling slots 76a are formed in a centerbody 58a.

The discharge nozzle 116b is attached to the nacelle 57 downstream of the discharge nozzle 116a. The discharge nozzle 116b includes three rings 118b located upstream of an apex 72b of a centerbody 58b. In addition, three cooling slots 76b are formed in the centerbody 58b, one upstream of the apex 72b and two downstream of the apex 72b. The discharge nozzle 116b receives at least part of an exhaust flow exiting the discharge nozzle 116a, as well as cooling fluid from one or more of scoops 120, 122, and 124, or cooling slots 126 formed in the nacelle 57.

Figure 6:
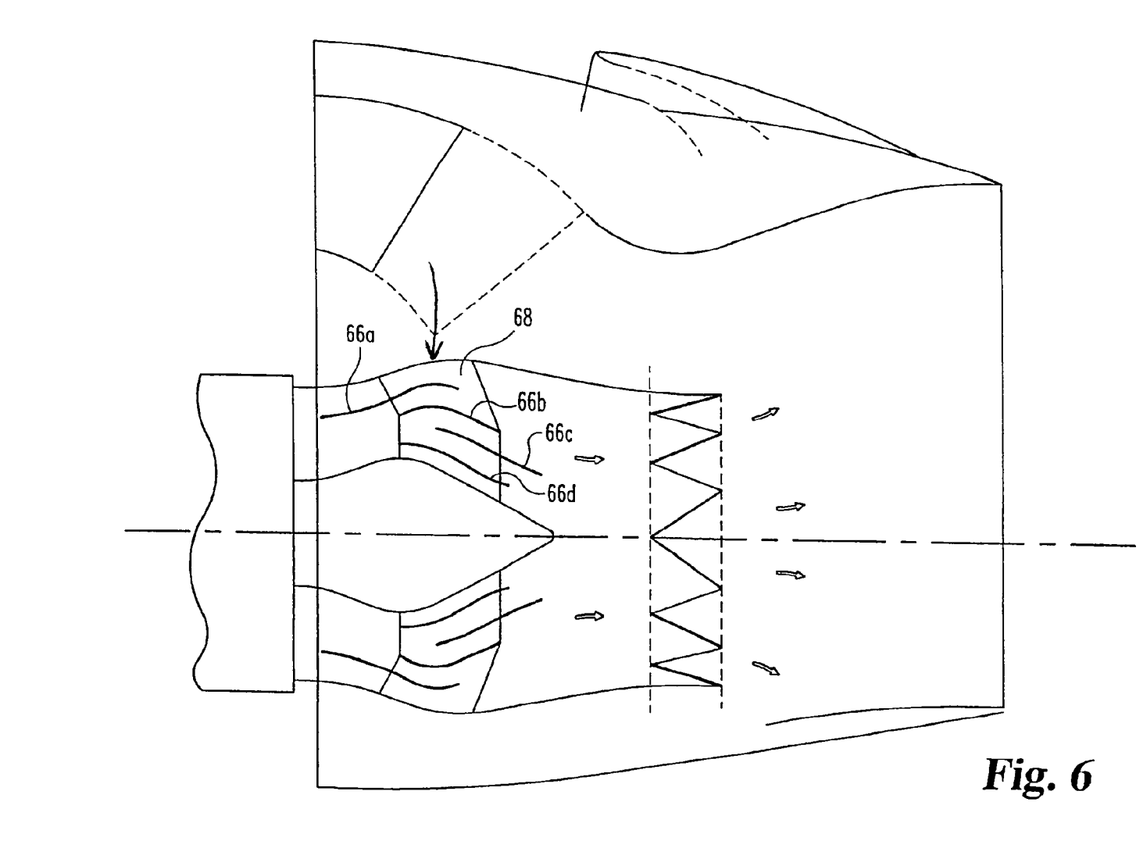
FIG. 6 is a partial schematic, side sectional view of a further type of discharge subsystem to reduce detection of infrared radiation through an outlet of the gas turbine engine.

Turning now to FIG. 6, a partial cross-sectional view is shown of another form of the discharge nozzle 54 within the nacelle 57. The discharge nozzle 54 includes four rings 66a, 66b, 66c, and 66d, each of which has different placement and airfoil characteristics. The ring 66a includes a leading edge positioned upstream of the leading edge of the strut 68, as well as a trailing edge located upstream from the trailing edge of the strut 68. The rings 66b and 66d each have leading edges and trailing edges that coincide with the leading edge and trailing edge of the strut 68, but the rings 66b and 66d at least have a different camber. The ring 66c has a leading edge located downstream of the leading edge of the strut 68, and a trailing edge located downstream of the trailing edge of the strut 68.

Many different embodiments of the present application are envisioned. In one example, a gas turbine engine includes a turbine and a discharge nozzle downstream of the turbine. The discharge nozzle includes a conduit defining a passage in fluid communication with the turbine and an outlet downstream of the turbine, the outlet being structured to discharge working fluid from the turbine. A centerbody is positioned in the conduit. Several rings circumscribe the centerbody, the rings cooperating with the centerbody to reduce line of sight to the turbine through the nozzle. One or more struts connected to the rings and one or more of the conduit and the centerbody. The struts are structured to position the rings in a nested relationship relative to one another between the turbine and the outlet.

In a further embodiment of the present application, a gas turbine engine includes a turbine and a nozzle downstream of the turbine. The nozzle includes a conduit defining a passage in fluid communication with the turbine and an outlet downstream of the turbine to receive hot working fluid therefrom. It also includes a centerbody positioned in the conduit along a first axis that extends from the turbine to the outlet. Several rings each circumscribe the centerbody, the rings cooperating with the centerbody to reduce line of sight of the turbine through the outlet to suppress infrared detection. The rings are positioned in a staggered relationship relative to one another along the first axis between the turbine and the outlet. The rings each have a different maximum dimension across the passage along a second axis perpendicular to the first axis.

In still another embodiment of the present application, a gas turbine engine includes a turbine and a conduit. The conduit defines a passage in fluid communication with the turbine and an outlet downstream of the turbine, a centerbody positioned along a central axis through the conduit, and several rings that circumscribe the centerbody. Each one of the rings is in a nested relationship relative to at least one of the other rings. The rings are staggered along the central axis, and the rings are positioned in cooperation with the centerbody to reduce line of sight visibility of the turbine through the outlet. A first portion of the passage extends a first distance perpendicular to the axis, a second portion of the passage upstream of the first portion extends a second distance perpendicular to the central axis, and a third portion of the passage downstream of the first portion extends a third distance perpendicular to the central axis. The first distance is greater than the second distance and the third distance. One or more of the rings are within the first portion of the passage.

In a further embodiment of the present application, a gas turbine engine is uniquely operated. The turbine discharges working fluid downstream through a conduit defining a passage in fluid communication with the turbine and an outlet downstream of the turbine. The turbine suppresses an infrared signature detectable through the outlet with a suppression assembly including a centerbody extending along an axis from the turbine to the outlet and several rings positioned about the centerbody with one or more struts. Each one of the rings is in a nested relationship relative to at least one other of the rings. The rings are positioned in cooperation with the centerbody to at least partially block visibility of the turbine through the outlet. One or more of the rings are cooled by providing a cooling fluid to the one or more rings through a passageway defined through at least one of the struts.

Yet another embodiment includes a gas turbine engine having a turbine. Also included are: means for discharging working fluid downstream through a conduit defining a passage in fluid communication with the turbine and an outlet downstream of the turbine; means for suppressing an infrared signature detectable through the outlet with a suppression assembly including a centerbody extending along an axis from the turbine to the outlet and several rings positioned about the centerbody with one or more struts. Each one of the rings is in a nested relationship relative to at least one other of the rings. The rings are positioned in cooperation with the centerbody to at least partially block visibility of the turbine through the outlet. Also included is: means for cooling one or more of the rings by providing a cooling fluid to the one or more rings through a passageway defined through at least one of the struts.

Still a further embodiment of the present application comprises: operating a gas turbine engine, including a turbine discharging working fluid downstream through a conduit defining a passage in fluid communication with the turbine and an outlet downstream of the turbine. A centerbody extends along a first axis through the conduit. The centerbody circumscribes with each of several rings. Each one of the rings being in a nested relationship relative to at least one other of the rings. The rings being staggered along the first axis, and the rings being positioned in cooperation with the centerbody to reduce line of sight visibility of the turbine through the outlet. The outlet defines: (a) a first portion of the passage to extend a first distance perpendicular from the first axis, (b) a second portion of the passage upstream of the first portion to extend a second distance perpendicular from the first axis, and (c) a third portion of the passage downstream of the first portion to extend a third distance perpendicular from the first axis, the first distance being greater than the second distance and the third distance, and one or more of the rings being within the first portion of the passage.

Still a further embodiment includes a gas turbine engine having a turbine. Also included are: means for discharging working fluid downstream through a conduit defining a passage in fluid communication with the turbine and an outlet downstream of the turbine. A centerbody extends along a first axis through the conduit. The centerbody circumscribes with each of several rings. Each one of the rings being in a nested relationship relative to at least one other of the rings. The rings being staggered along the first axis, and the rings being positioned in cooperation with the centerbody to reduce line of sight visibility of the turbine through the outlet. The outlet defines: (a) a first portion of the passage to extend a first distance perpendicular from the first axis, (b) a second portion of the passage upstream of the first portion to extend a second distance perpendicular from the first axis, and (c) a third portion of the passage downstream of the first portion to extend a third distance perpendicular from the first axis, the first distance being greater than the second distance and the third distance, and one or more of the rings being within the first portion of the passage.

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary. While the invention has been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein or by any following claim are desired to be protected.

What is claimed is:

1. An apparatus, comprising: a gas turbine engine including a turbine and a discharge nozzle downstream of the turbine, the discharge nozzle including:
   a conduit defining a passage in fluid communication with the turbine and an outlet downstream of the turbine, the outlet being structured to discharge working fluid from the turbine;
   a centerbody positioned in the conduit along a first axis;
   several rings each circumscribing and offset from the centerbody and disposed between an outer flow wall of the conduit and the centerbody, the rings cooperating with the centerbody to reduce line of sight to the turbine through the nozzle, where line of sight is defined as a line disposed to a side of a centerline of the gas turbine engine and that extends from a location external of the discharge nozzle toward the turbine, and where said line does not cross the centerline of the gas turbine engine between the external location and the turbine; and
   one or more struts connected to the rings and one or more of the conduit and the centerbody, the struts being structured to position the rings in a nested relationship relative to one another between the turbine and the outlet;
   wherein a first portion of the passage extends a first distance perpendicular from the first axis, (b) a second portion of the passage upstream of the first portion extends a second distance perpendicular from the first axis, and (c) a third portion of the passage downstream of the first portion extends a third distance perpendicular from the first axis, the first distance being greater than the second distance and the third distance, and one or more of the several rings being within the first portion of the passage.

2. The apparatus of claim 1, wherein the nozzle defines a mixer downstream of the rings to intermix fluids of different temperatures.

3. The apparatus of claim 1, further comprising an aircraft carrying the gas turbine engine and the discharge nozzle to provide propulsive power to the aircraft.

4. The apparatus of claim 1, wherein the rings number at least three, each have an airfoil-shaped profile, and are structured with the centerbody to block a line of sight to the turbine.

5. The apparatus of claim 1, wherein the one or more struts each define a cooling passageway in fluid communication with a cooling fluid source.

6. The apparatus of claim 5, wherein the rings each include a cooling plenum to receive cooling fluid from the cooling passageway of at least one of the struts.

7. The apparatus of claim 1, further comprising means for cooling the rings and the centerbody.

8. The apparatus of claim 1, wherein the rings number between three and six and each include a plenum in fluid communication with one or more of a corresponding number of passageways each defined by a different one of the struts to receive a cooling fluid therethrough, the centerbody defines a cooling pathway connected to at least one of the passageways, and the nozzle includes a mixer for intermixing fluids of different temperatures.

9. The apparatus of claim 8, wherein the rings each have a reflexed airfoil shape and are staggered relative to one another along a centerline axis of the nozzle.

10. An apparatus, comprising: a gas turbine engine including a turbine and a nozzle downstream of the turbine, the nozzle including:
- a conduit defining a passage in fluid communication with the turbine and an outlet downstream of the turbine to receive hot working fluid therefrom;
- a centerbody positioned in the conduit along a first axis that extends from the turbine to the outlet such that a flow path is defined between the conduit and the centerbody; and
- several rings each circumscribing the centerbody, the rings cooperating with the centerbody to reduce line of sight of the turbine through the outlet to suppress infrared detection where line of sight is a line extending from an external observer to the turbine outlet and is offset to one side and does not cross a centerline of the gas turbine engine, the rings displaced from the centerbody and being positioned in a staggered relationship relative to one another along the first axis between the turbine and the outlet, the rings each having a different maximum dimension across the passage along a second axis perpendicular to the first axis;
- wherein a first portion of the passage extends a first distance perpendicular from the first axis, (b) a second portion of the passage upstream of the first portion extends a second distance perpendicular from the first axis, and (c) a third portion of the passage downstream of the first portion extends a third distance perpendicular from the first axis, the first distance being greater than the second distance and the third distance, and one or more of the several rings being within the first portion of the passage.

11. The apparatus of claim 10, wherein the nozzle defines means for mixing fluids of different temperatures downstream of the centerbody and the rings.

12. The apparatus of claim 10, further comprising an aircraft carrying the gas turbine engine and the nozzle to provide propulsive power to the aircraft.

13. The apparatus of claim 10, wherein the rings number at least three, each have an airfoil-shaped profile, and are structured with the centerbody to block the line of sight to the turbine.

14. The apparatus of claim 10, further comprising means for cooling the rings and the centerbody.

15. The apparatus of claim 10, wherein the rings each have a reflexed airfoil shape and are staggered relative to one another along a centerline axis of the nozzle.

16. An apparatus, comprising: a gas turbine engine including a turbine and
- a conduit, the conduit defining a passage in fluid communication with the turbine and an outlet downstream of the turbine wherein the passage includes a radially inner flow path surface and a radially outward flow path surface, a centerbody positioned along a central axis through the conduit which forms a flow passage between the conduit and the centerbody; several rings radially outward from the centerbody that circumscribe the centerbody, each one of the rings being in a nested relationship relative to at least one other of the rings, the rings being staggered along the central axis, and the rings being positioned in cooperation with the centerbody to reduce line of sight visibility of the turbine through the outlet; and
- wherein a first portion of the radially outer flow path surface of the passage extends a first distance perpendicular to the axis, a second portion of the radially outer flow path surface of the passage upstream of the first portion extends a second distance perpendicular to the central axis, and a third portion of the radially outer flow path surface of the passage downstream of the first portion extends a third distance perpendicular to the central axis, the first distance being greater than the second distance and the third distance, and one or more of the rings being within the first portion of the passage.

17. The apparatus of claim 16, further comprising a mixer downstream of the rings to intermix fluids of different temperatures.

18. The apparatus of claim 16, further comprising an aircraft carrying the gas turbine engine to provide propulsive power to the aircraft.

19. The apparatus of claim 16, wherein the rings number at least three, each have a reflexed airfoil shape.

20. The apparatus of claim 16, further comprising one or more struts each connected to the conduit and the centerbody and each defining a cooling passageway in fluid communication with a cooling fluid source.

21. The apparatus of claim 20, wherein the rings each include a cooling plenum to receive cooling fluid from the cooling passageway of at least one of the struts.

22. A method, comprising:
- operating a gas turbine engine including a turbine;
- discharging working fluid downstream through a conduit defining a passage in fluid communication with the turbine and an outlet downstream of the turbine;
- extending a centerbody along a first axis through the conduit and positioned radially inward from an inner surface of the conduit;
- circumscribing the centerbody with each of several rings, each one of the rings being in a nested relationship relative to at least one other of the rings, the rings displaced outward from the centerbody and being staggered along the first axis, and the rings being positioned in cooperation with the centerbody to reduce line of sight visibility of the turbine through the outlet; and
- defining: (a) a first portion of the passage to extend a first distance perpendicular from the first axis, (b) a second portion of the passage upstream of the first portion to extend a second distance perpendicular from the first axis, and (c) a third portion of the passage downstream of the first portion to extend a third distance perpendicular from the first axis, the first distance being greater than the second distance and the third distance, and one or more of the rings being within the first portion of the passage.

23. The method of claim 22, which includes providing a mixer to intermix fluids of different temperatures downstream of the rings and the centerbody.

24. The method of claim 22, which includes cooling at least one of the rings by providing a cooling fluid through one or more struts in fluid communication therewith.

25. The method of claim 24, which includes radially extending the one or more struts between the centerbody and the conduit across the passage.

26. The method of claim 25, which includes providing the cooling fluid to the rings and the centerbody through the one or more struts.

27. The method of claim 22, wherein a first one of the rings has a different airfoil shape than a second one of the rings.

28. The method of claim 22, wherein an outer one of the rings is positioned closer to the turbine than an inner one of the rings.

* * * * *